March 13, 1928. 1,662,467
G. T. MINSHALL
ROOT ERADICATOR
Filed Sept. 6, 1923 2 Sheets-Sheet 1
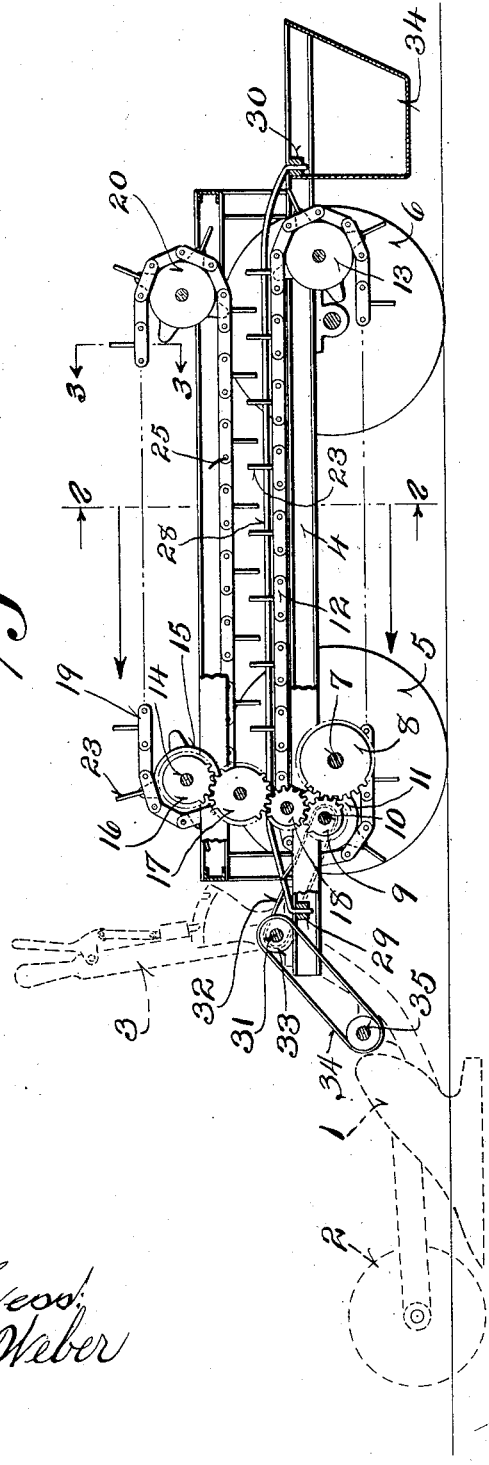
Inventor
George T. Minshall March 13, 1928.
G. T. MINSHALL
ROOT ERADICATOR
Filed Sept. 6, 1923
1,662,467
2 Sheets-Sheet 2
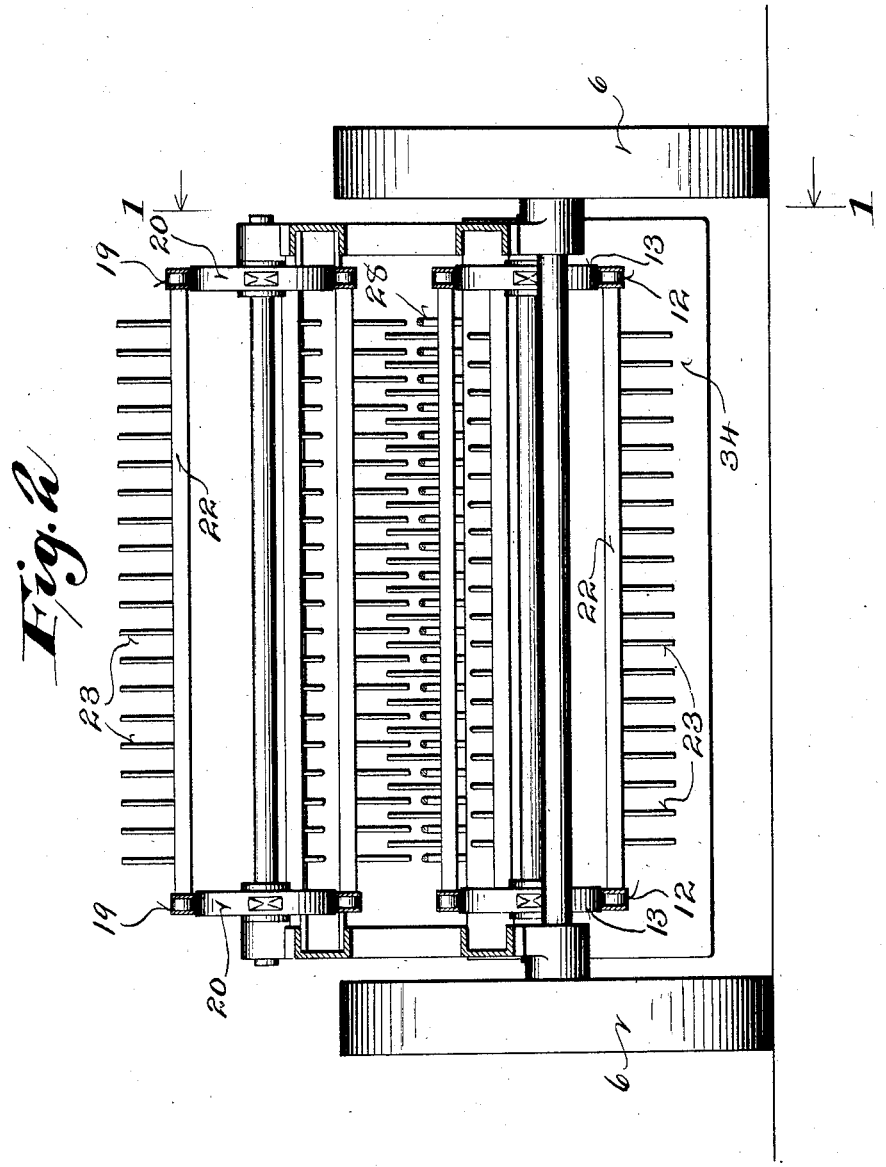

Patented Mar. 13, 1928.

1,662,467

UNITED STATES PATENT OFFICE.

GEORGE T. MINSHALL, OF ELKHORN, WISCONSIN.

ROOT ERADICATOR.

Application filed September 6, 1923. Serial No. 661,212.

This invention relates to root eradicators.

In plowing fields difficulty has been experienced in preventing the roots which have been dug up by the plow from again growing. The roots usually come up whole or intact and easily begin to grow again as they immediately fall into the soft upturned ground.

This invention is designed to overcome the above noted difficulties, and objects of this invention are, therefore, to provide a root eradicator which may follow a plow and prevent the plowed up roots from growing again, to provide a root eradicator which will operate upon the roots, which will separate the roots from the upturned earth, and which will collect the roots.

Further objects are to provide a root eradicator which is of simple and sturdy construction, which is provided with open or skeleton belts through which the dirt may fall, and which is equipped with yielding fingers which will shake the dirt from roots but which will yield when a stone becomes accidentally delivered to the belts.

Embodiments of the invention are shown in the accompanying drawings, in which:—

Figure 1 is a sectional elevation of the device corresponding roughly to a section on the line 1—1 of Figure 2 with a portion of the apparatus broken away to illustrate the interior construction.

Figure 2 is a vertical transverse sectional view on the line 2—2 of Figure 1.

Figure 3 is a sectional view on the line 3—3 of Figure 1.

Figure 4 is a sectional view on the line 4—4 of Figure 3.

Figure 5 is a fragmentary detail of a further form of finger.

The apparatus comprises a traveling member which is adapted to hook behind a plow or plows 1 and a colter or cutter 2 preceding the plow. If desired, means such as illustrated generally at 3, may be provided for varying the depth at which the plow operates.

The apparatus forming the subject matter of this invention comprises a frame 4 which may be formed of channel irons, as illustrated in the drawings, to secure the desired rigidity while keeping the weight down. This frame is supported by front and rear wheels 5 and 6, one or both of the front wheels 5 being rigidly secured to a front axle 7.

This front axle has rigidly secured thereto a driving gear 8 which meshes with a smaller pinion 9. The pinion 9 drives a shaft 10 upon which it is rigidly carried— the shaft 10 being journaled in the lower portion of the frame work. This shaft has attached adjacent its ends sprocket wheels 11 which engage a link chain 12. The rear portion of this endless chain is carried by sprocket wheels 13 carried by a rear shaft suitably journaled in the lower portion of the frame work.

An upper driving shaft 14 is journaled in the upper portion of the frame work and rigidly carries sprocket wheels 15 adjacent its ends and a driving pinion 16. This driving pinion is connected through a pair of idler gears 17 and 18 with the pinion 9, and it is to be noted that the proportioning of the gears 9 and 16 is such that the rate of revolution of the shaft 10 is approximately twice that of the shaft 14. A link chain 19 is provided for each of the sprocket wheels 15 similar to the pair of link chains 12, and a pair of rear sprocket wheels 20 are provided for supporting the rear end of these chains. The chains 12 and the chains 19 have certain of the links, as illustrated in Figure 3, provided with inwardly projecting trunnions 21 upon which are mounted socketed bars 22, as illustrated in Figure 4. These bars are provided with outwardly projecting pins 23, which, in the form illustrated in Figures 1 to 4, are rigid therewith. The bars 22 are prevented from turning under usual conditions out of their normal position by means of spiral springs 24 which have one end rigidly attached to such bars and the other end, as indicated at 24, eyeletted and carried by the connecting pins 25 of the links, as may be seen from Figures 3 and 4. This, it will be seen, provides a yielding set of fingers and also provides a skeleton or open work pair of belts.

A further form which these fingers may take is illustrated in Figure 5 in which the rods 26 are rigidly carried by the links 19′ and have secured thereto resilient fingers 27 which may, if desired, take the form of leaf springs as illustrated. A plurality of rods 28 extend the full length of the machine and are secured at their forward and rear ends to transverse bars 29 and 30 respectively. Their forward and rear ends may be curved or slanting, as illustrated in Figure 1, to facilitate the passage thereover of the roots.

Adjacent the front of the machine a shaft 31 is journaled and is driven from the shaft 10 by suitable pulleys and a belt 32. This shaft is provided with a drum 33 over which passes an elevating conveyor 34 whose forward end travels over a drum 35 immediately to the rear of the plows 1.

Adjacent the rear of the machine the lower side frames extend and receive a root receiving receptacle 34 into which the roots are adapted to be discharged from the machine.

The operation of the apparatus is as follows:—As the plow draws the machine across the field the roots and the soil fall upon the conveyor 34 which quickly elevate it and it is thrown on to the bars 38. This material is engaged by the fingers 23 of the open or skeleton belt and is broken up and drawn rearwardly through the machine,— the dirt falling freely through the open belt.

Although both belts have been described as open frame work belts, it may be found desirable under certain conditions to form the upper belt of a closed construction. Also although fingers are the preferred form of the invention such fingers projecting outwardly from the belts, it may, under certain conditions be found possible to eliminate the fingers and locate the belts more closely adjacent each other than shown in the drawings, and in this way roll or break the dirt directly between the belts.

It is to be particularly noted that the lower belt travels at approximately twice the speed of the upper belt and consequently the intermeshing fingers 23 of the upper and lower belts act to break up the dirt and to knock the dirt from the roots. The roots are discharged from the belt into the rear root receiving hopper 34 and are thus collected.

It will be seen, therefore, that a root eradicator has been provided which will separate the dirt from the roots, and which will collect the roots.

Although a few forms of the invention have been described in considerable detail, it is to be understood that the invention may be variously embodied and is, therefore, to be limited only as claimed.

I claim:

A root eradicator comprising an upper frame member and a lower frame member, spacing members holding said frame members apart, supporting wheels having shafts journalled in the lower frame member, drums carried by said lower frame member and spaced apart and positioned adjacent the front and rear of the machine, drums carried by the upper frame member and spaced apart and positioned adjacent the ends of the machine, means for driving the drums from said wheels, a lower endless belt carried by said first mentioned drums, an upper endless belt carried by said second mentioned drums, said belts having horizontal stretches positioned between said frame members and having teeth arranged in staggered relation, said means for driving the belts imparting different speeds to said belts, said lower frame member extending forwardly and rearwardly beyond said first mentioned drums, guiding rods carried by said lower frame member and projecting beyond said belts, a hopper carried by the rear projecting portion of said lower frame member, said rods extending into said hopper, and means for elevating soil and roots and depositing such soil and roots upon said guiding rods, whereby said soil and roots may be picked up by said belts, and the roots broken by the fingers carried by said belts and deposited in said hopper.

In testimony that I claim the foregoing I have hereunto set my hand at Elkhorn, in the county of Walworth and State of Wisconsin.

GEORGE T. MINSHALL.